Patented Sept. 18, 1934

1,973,794

UNITED STATES PATENT OFFICE 1,973,794

STABLE AQUEOUS SOLUTIONS OF ANÆSTHETIC SUBSTANCES

Max Bockmühl and Willy Ludwig, Frankfort-on-the-Main, Germany, assignors to Winthrop Chemical Company, New York, N. Y., a corporation of New York No Drawing. Application December 16, 1932, Serial No. 647,695. In Germany December 17, 1931

6 Claims. (Cl. 167—52)

The present invention relates to stable aqueous solutions of anæsthetic substances.

It is known to prepare a solution of the hydrochloride of para-aminobenzoic acid diethylaminoethylester by adding a colloid, such as gliadine, to the aqueous solution of the said anæsthetic substance (cf., for instance, Pitkin, British Med. Journal, 1929, II, page 183). The increased viscosity of the aqueous solution which is due to the addition of the colloid renders the solution suitable for lumbar anæsthesia. Whereas it is possible according to this method to prepare a solution containing, for instance, 40% of the hydrochloride of para-aminobenzoic acid diethylaminoethylester, it has been found that when the said process is applied to the alkamine-esters of N-monoalkylated and N-monoalkyloxyalkylated derivatives of para-and orthoaminobenzoic acid described in Eisleb's U. S. Patents Nos. 1,550,350 dated August 18, 1925 and 1,704,660 dated March 5, 1929 the comparatively great solubility in water of, for instance, the hydrochlorides or sulfates of the said substances is extremely diminished. Thus, for instance, the solubility of the hydrochloride of para-butylaminobenzoic acid dimethylaminoethylester is reduced from about 15% to less than 0.5% and, consequently, is no longer sufficient for the purposes of lumbar anæsthesia.

Now, we have found that aqueous solutions of anæsthetic substances comprising a prolamine, wheat mucilage and a salt of an organic hydroxylated carboxylic acid with a compound of the following formula:

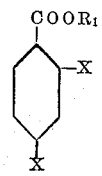

wherein $R_1$ stands for an alkamine group, one X for hydrogen, the other X for the group —$NH.R_2$, $R_2$ being an alkyl or an alkyl-alkyloxy group, are stable and highly viscous.

It could in no way be foreseen that the said alkamine-esters in the form of their salts with aliphatic or hydroaromatic hydroxy acids would be soluble to such a degree as to yield concentrations high enough for the purposes of lumbar anæsthesia. The alkamine esters used differ fundamentally from the para-aminobenzoic acid diethylaminoethylester so that the preparation of highly viscous solutions of the alkamine esters used could in no way be concluded from the known process of preparing solutions of the hydrochloride of the said ethylester. The fact that, as above mentioned, the hydrochlorides of the two esters physically behave totally differently from each other can only be explained by the different chemical constitution of the two bodies which manifests itself in the one case in the presence of a primary, and in the other case in the presence of a secondary aromatic amino group. This difference of constitution is not only the cause of the different physical properties of the compounds but also of the quantitative and qualitative difference in the physiologic action of the bodies insofar as the para-aminobenzoic acid diethylaminoethylester is a conductive anæsthetic and the alkamine esters used according to the present invention are moreover and in the first line agents for producing surface anæsthesia. The two compounds belong to different classes of bodies so that the behaviour of the one body could not be concluded from the behaviour of the other body.

The enhanced solubility of the alkamine esters in the form of their salts of hydroxy acids is not only inherent to the solutions immediately after their preparation. Even after a prolonged time the solutions show an unaltered stability. They may be sterilized by heating to 100° C.

According to the present invention, it is advantageous to prepare at first a solution of the colloid of suitable concentration and to add thereafter the alkamine ester in the form of a salt. It is also possible to dissolve the anæsthetic substance simultaneously with the necessary quantity of colloid. There may also be added to the solutions additional substances such as preserving agents or the like.

As anæsthetic substances there may be used, for instance, the products described in U. S. Patents No. 1,550,350 and No. 1,889,645. As hydroxylated carboxylic acids there may be used aliphatic compounds such as citric acid, glycollic acid, lactic acid, or hydroaromatic compounds such as quinic acid.

The following examples serve to illustrate the invention but they are not intended to limit it thereto:

(1) 25 grams of 4-butylaminobenzoic acid-beta-dimethylaminoethylester are converted into the salt of quinic acid by means of 18.75 grams of quinic acid in 470 cc. of water; there are subsequently added 200 cc. of wheat mucilage (0.75% dry residue) 250 cc. of alcohol and 40.6 cc. of gliadinal alcohol (3% of dry residue). The whole is made up to 3 liters by means of distilled water and 0.5% of acetone bisulfite is added. The solution is filtered and filled into ampoules. The ampoules are sterilized at 105° C. for 10 minutes.

(2) 2.9 grams of 4-beta-methoxyethylaminobenzoic acid-beta-diethylaminoethylester (base) are heated on the steam bath for 30 minutes with 1.9 grams of quinic acid in 45 cc. of water. There are subsequently added 20 cc. of wheat mucilage, 25 cc. of alcohol and 4 cc. of gliadinal alcohol; the whole is then made up to 300 cc. by means of distilled water. The solution is filtered and further treated as indicated in Example 1.

(3) 2.8 grams of 2-N-propylaminobenzoic acid - beta - diethylaminoethylester (base) are heated on the steam bath for 30 minutes with 2.1 grams of citric acid in 45 cc. of water. There are added subsequently 20 cc. of wheat mucilage and 4 cc. of gliadinal alcohol. Thereafter, the whole is made up to 300 cc. by means of distilled water and the solution is further treated as in Example 1.

(4) 2.8 grams of 4-propylaminobenzoic acid-1-dimethylaminobutyl-3-ester are gently heated at 30° C. with 0.8 gram of glycollic acid in 45 cc. of water. There are subsequently added 20 cc. of wheat mucilage and 4 cc. of gliadinal alcohol and the whole is made up to 300 cc. by means of distilled water. The solution is then filled in ampoules as indicated in Example 1.

We claim:

1. Aqueous solutions of anæsthetic substances comprising a prolamine, wheat mucilage and a salt of an organic hydroxylated carboxylic acid with a compound of the following formula:

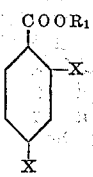

wherein $R_1$ stands for an alkamine group, one X for hydrogen, the other X for the group—$NH.R_2$, $R_2$ being an alkyl or an alkyl-alkyloxy group.

2. Aqueous solutions of anæsthetic substances comprising a prolamine, wheat mucilage and a salt of an acid of the group consisting of hydro-aromatic and aliphatic hydroxylated carboxylic acids with a compound of the following formula:

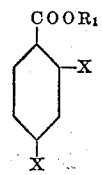

wherein $R_1$ stands for an alkamine group, one X for hydrogen, the other X for the group—$NH.R_2$, $R_2$ being an alkyl or an alkyl-alkyloxy group.

3. Aqueous solutions of anæsthetic substances comprising a prolamine, wheat mucilage and a salt of an acid of the group consisting of hydro-aromatic and aliphatic hydroxylated carboxylic acids with a compound of the following formula:

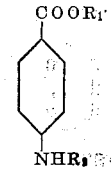

wherein $R_1$ stands for an alkamine group, $R_2$ for an alkyl group.

4. An aqueous solution of an anæsthetic substance comprising gliadinal alcohol, wheat mucilage and the salt of 4-butylaminobenzoic acid-beta-dimethylaminoethylester with quinic acid.

5. An aqueous solution of anæsthetic substance comprising gliadine alcohol, wheat mucilage and the salt of o-N-propylaminobenzoic acid-beta-diethylaminoethylester with citric acid.

6. An aqueous solution of an anæsthetic substance comprising gliadine alcohol, wheat mucilage and the salt of 4-propylaminobenzoic acid-1-dimethylaminobutyl-3-ester with glycollic acid.

MAX BOCKMÜHL.
WILLY LUDWIG.